United States Patent

[11] 3,598,209

| [72] | Inventor | Shairyl I. Pearce |
| | | Tazewell, Ill. |
| [21] | Appl. No. | 784,119 |
| [22] | Filed | Dec. 16, 1968 |
| [45] | Patented | Aug. 10, 1971 |
| [73] | Assignee | Caterpillar Tractor Co. |
| | | Peoria, Ill. |

[54] DOWNSHIFT PREVENTION DEVICE WITH BRAKE OR CONVERTOR OVERRIDE
10 Claims, 3 Drawing Figs.

[52] U.S. Cl. ................................ 192/4 A,
74/475, 74/540, 74/732
[51] Int. Cl. ........................................... F16h 57/10
[50] Field of Search ............................ 74/475,
540, 732; 192/4 R, 4 A

[56] References Cited
UNITED STATES PATENTS

| 3,096,667 | 7/1963 | Dickeson et al. | 74/731 |
| 2,039,553 | 5/1936 | Roehrl | 192/4 A |
| 2,180,154 | 11/1939 | Lenz | 192/114 X |
| 2,277,244 | 3/1942 | Marcum | 192/4 A X |
| 2,286,671 | 6/1942 | Crittenden et al. | 192/114 X |
| 2,312,424 | 3/1943 | Lentz | 192/114 X |
| 2,411,455 | 11/1946 | Mullins | 192/4 A |
| 2,745,526 | 5/1956 | Saives | 192/4 A |
| 3,169,616 | 2/1965 | Hunsaker et al. | 192/4 R |

*Primary Examiner*—Benjamin W. Wyche
*Attorney*—Fryer, Tjensvold, Feix, Phillips & Lempio ABSTRACT: A system for the prevention of a downshift of a transmission in a direct or overdrive mode wherein a pneumatically actuated pin, acting upon a cam, prevents the shifting of a transmission to a lower gear. When a directional valve is actuated by a signal responsive to the transmission being in the torque converter mode, the pin is biased away from the cam allowing such a downshift. When the operator must stop the vehicle at all costs to insure his own safety, a directional valve is actuated by the brake system so as to release the pin, allowing the transmission to be downshifted.

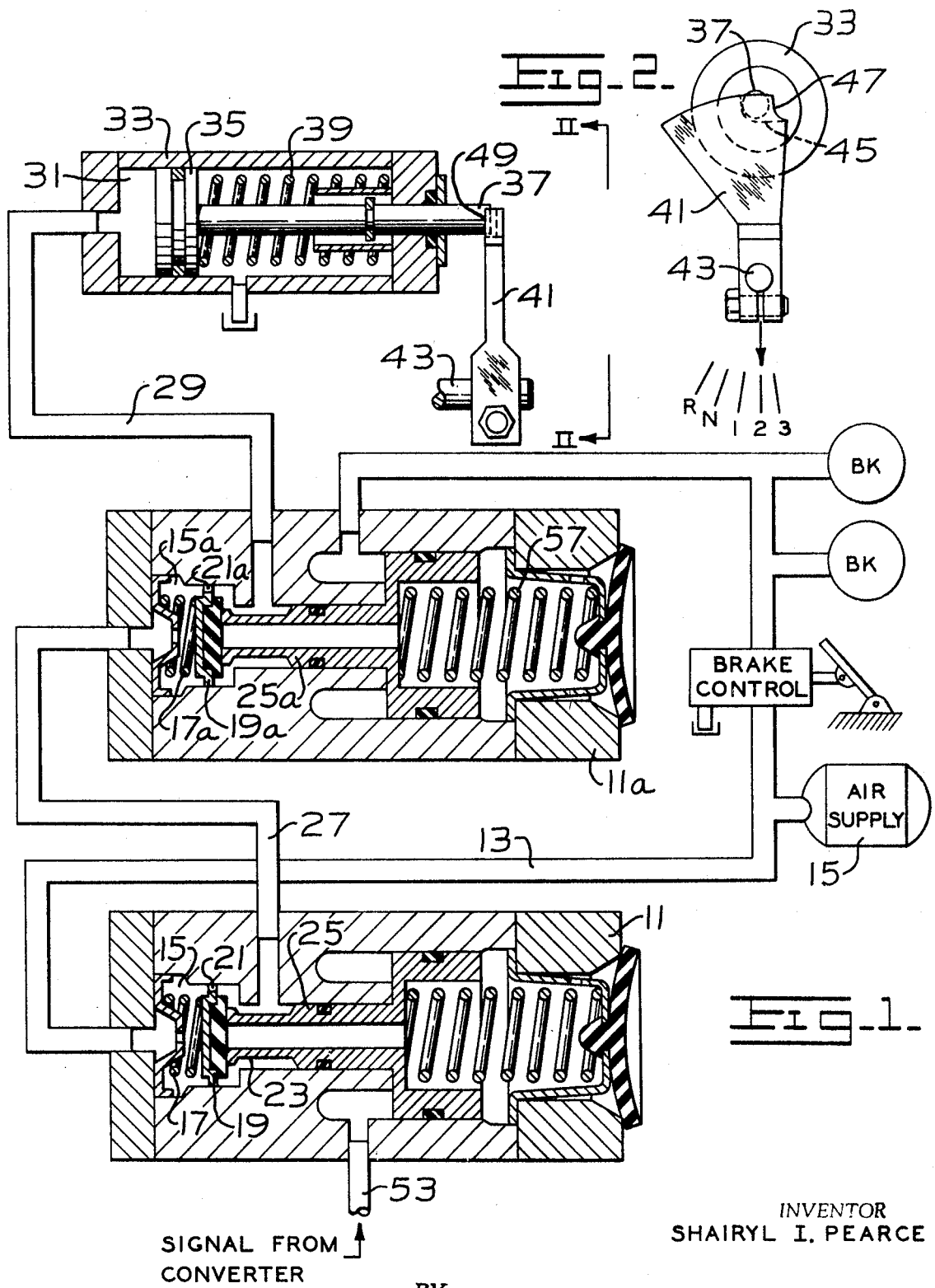

DOWNSHIFT PREVENTION DEVICE WITH BRAKE OR CONVERTOR OVERRIDE

BACKGROUND OF THE INVENTION

Many vehicles in use today are equipped with a transmission having torque converter, direct, and overdrive modes with automatic shifting from one mode to another in each of the forward speeds provided. An example of such a transmission, having three forward speeds with the three modes of operation in each speed, is shown in U.S. Pat. No. 3,096,667 issued July 9, 1963, assigned to the assignee of this invention. The contents, including specification and drawings, of this exemplary patent are hereby expressly incorporated by reference into the instant application.

When such a transmission is in the direct or overdrive range in any speed above its lowest gear, if it is manually downshifted to a lower speed an overspeeding of the engine may result in severe damage. When the transmission is in the torque converter mode, it may be downshifted to the next lowest selectable speed range without risk of engine damage.

In some vehicles, safety warnings have been mounted on the operator's control panel warning him against overspeeding the engine. Other vehicles utilize warning lights to indicate when the machine is in a torque converter drive or when downshifting may be accomplished safely. A few available vehicles provide rather complicated systems for prevention of a downshift and such systems are expensive to manufacture and maintain.

At the same time, it may sometimes be necessary for the operator to downshift in the direct or overdrive mode, regardless of the potential damage to the vehicle, so that his own safety may be insured. Therefore, it will be necessary to produce such a system which minimizes potential damage to the vehicle while maximizing operator safety.

It is therefore an object of this invention to provide an improved downshift prevention system which is relatively simple and inexpensive.

It is also an object of this invention to provide a system for the prevention of the downshifting of a vehicle transmission unless the transmission is in the torque converter mode of operation.

It is also an object of this invention to provide such a system wherein downshifting of the transmission in the direct drive or overdrive modes is allowed only in a panic-stop situation.

It is also an object of this invention to provide a system which, in response to a torque converter actuation signal, will allow downshifting of a transmission, but will prevent such downshifting in the absence of that signal.

It is a further object of this invention to provide a system for the prevention of downshifting in a vehicle when the transmission of the vehicle is in a direct drive or overdrive mode of operation unless a full actuation of the brake system of the vehicle takes place.

It is a still further object of this invention to provide a system for the prevention of downshifting of a vehicle transmission unless the transmission is in a torque converter mode of operation or a panic-stop is called for by the vehicle operator.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 1 is a schematic illustration of a system embodying the present invention when the transmission is in the direct drive or overdrive mode of operation;

FIG. 2 is a view of the means for blocking a downshift of the transmission, taken along a line II–II of FIG. 1.

DETAILED DESCRIPTION

Figure 3:
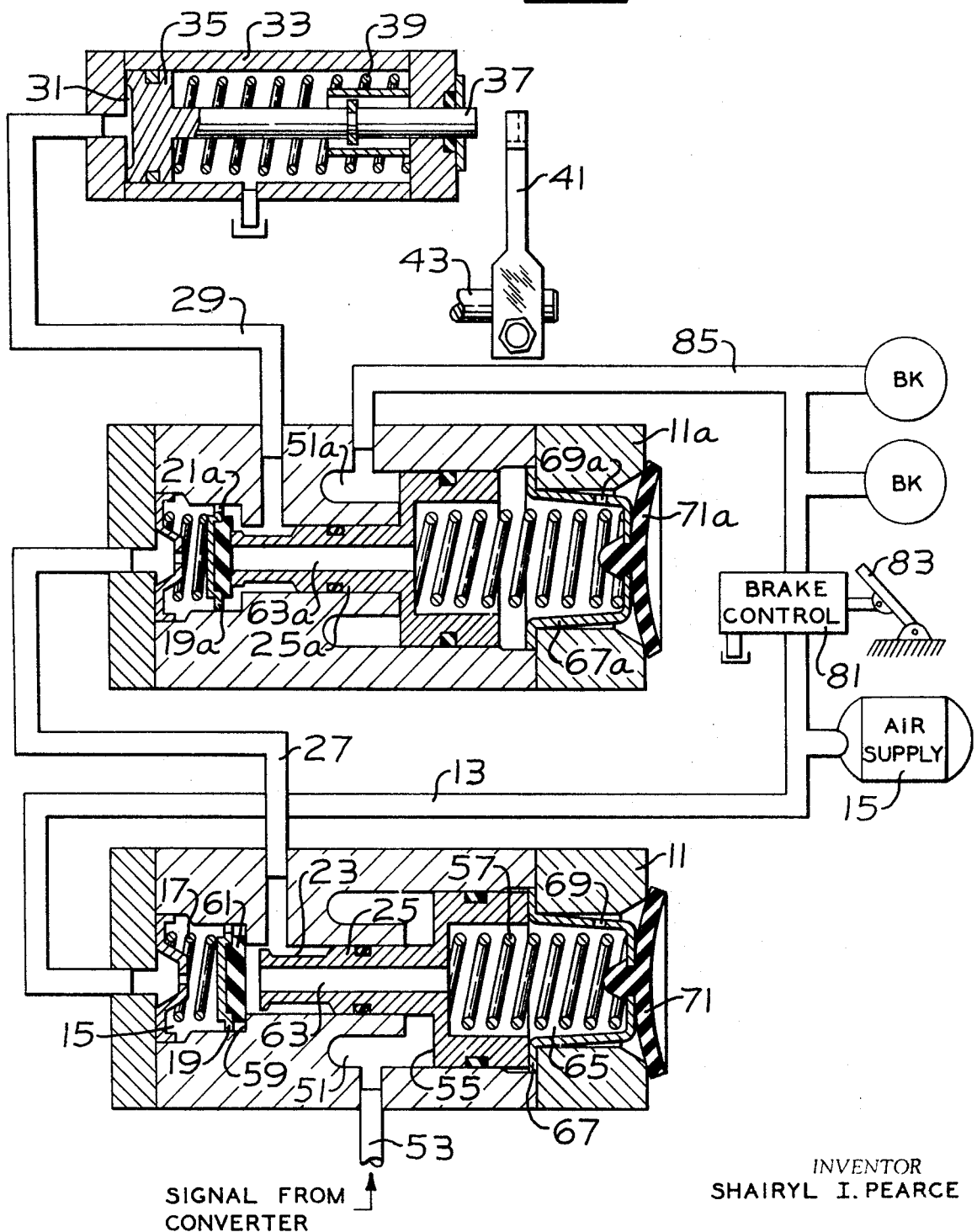
FIG. 3 is a schematic illustration similar to that of FIG. 1, with the vehicle transmission system in the torque converter mode of operation.

In the following description, it will be seen that there are two methods of release of the downshift preventer, with a different directional valve utilized for the control of each method. The invention has been illustrated and described in this manner for ease in understanding the invention. It is to be noted, however, that both methods of overriding the downshift preventer could be controlled through the use of a single directional valve with only slight modification.

Referring now to the drawings, there is shown a directional valve 11 which receives air through a line 13 from a vehicle air supply 15. The air in line 13 enters a compartment 15 in the valve 11 in which is situated a biasing spring 17 and a free, axially slidable spool 19. The air then passes through a plurality of notches 21 in the spool 19, about an annular groove 23 in a second spool 25, and into a line 27 through which it passes to a valve 11a. The air passes through similar structure in valve 11a and then into line 29 from which it enters a compartment 31 in a blocker or preventer 33.

The preventer basically comprises a cylinder in which is situated a piston 35 carrying an integrally mounted pin or cam follower 37. A spring 39 acts upon the piston, tending to move the pin toward a deactivated position.

When air pressurizes chamber 31, the pin 37 is extended from the preventer so as to move against a cam 41 mounted upon a transmission control shaft 43 which passes transversely through the control portion of a range transmission (not shown). The shaft 43 is rotated by well-known manually controlled linkages (not shown).

Near the periphery of the fan-shaped cam 41, a plurality of one-way, or stepped, notches 45 and 47 are suitably machined. A face 49 is also situated on the cam 41 on the side thereof adjacent pin 37.

As an example of the use of the cam 41, when the transmission control shaft 43 is positioned so that the transmission is in the first gear range, and the transmission is in the direct or overdrive mode of operation, pin 37 will abut face 49. When the operator shifts to second speed, the cam 41 will rotate to a position corresponding to FIGS. 2 and 3. The pin 37 retracts as a function of a torque converter mode signal (FIG. 3). When the transmission automatically shifts to the direct drive and overdrive modes of second speed, the pin 37 will extend into the notch 45. When the operator shifts to third speed, the same sequence takes place but with involvement of a notch 47. Thus, the operator can shift to higher gears at will but is restrained from shifting to lower gears by the depth sequencing of face 49, notch 45, and notch 47, unless pin 37 is retracted in a manner to be described.

Referring now to FIG. 3, there is illustrated the position of various portions of the control system when the transmission is in the torque converter range. An oil signal from the torque converter enters a compartment 51 in valve 11 via a line 53. The oil in compartment 51 acts against the piston surface 55 of spool 25, moving it against the force of a spring 57 to the position shown. When the spool 25 moves to this position, spool 19 is moved against a valve seat 59 by spring 17 so that a seal 61 on the spool shuts off communication between the air supply and line 27.

The air in preventer compartment 31 is then exhausted via line 29, valve 11a and line 27 into the annular groove 23 in valve 11. As shown, the valve spools 19 and 25 have separated so that the air in the annular groove 23 passes through an annular opening 63 in the spool 25 and into a compartment 65 which is formed by the spool 25 and a spring and valve keeper 67. The air then passes through openings 69 in keeper 67 and passes flutter valve 71 to the atmosphere.

This release of pressure in the preventer 33 causes the pin 37 to be retracted by spring 39 and the transmission control shaft 43 may be rotated to any position desired by the vehicle operator.

At certain times in the operation of the vehicle, it may become necessary to override the automatic downshift prevention previously described. This will occur during emergency situations in which the operator becomes so greatly endangered that the downshifting must be accomplished regardless of the possible damage to the engine. When this occurs, it is normal reaction on the part of the operator to actuate the vehicle brake system to the greatest extent possible. In such a case, when the operator actuates the brake control 81 by exerting a force on pedal 83 so as to cause an emergency stop, the air in line 13 supplied by the air supply system 15 passes through a line 85 into a compartment 51a in the valve 11a. This causes the spool 25a to be moved rightwardly to the same position previously described for the structure in valve 11, allowing air to be exhausted from compartment 31 in the preventer 33 through line 29, aperture 63a in the spool 25a, apertures 69a in keeper 67a, and past flutter valve 71a.

Thus, when a signal is received from the torque converter via line 53, the valve 11 is actuated so as to exhaust compartment 31 in the preventer, allowing downshifting of the transmission. Similarly, when the brakes are applied in a panic-stop situation, valve 11a allows for the exhaustion of compartment 31.

As previously stated, it will be obvious to one skilled in the art that with the proper placement of check valves, etc., line 85 could enter compartment 51 in valve 11 and both methods of exhausting compartment 31 in the preventer could operate through the single valve. In such a case, line 27 would, of course, deliver air directly to the preventer 33 rather than to another valve such as 11a. The preferred embodiment allows the use of different mediums; for example—air and hydraulic fluid could not mix within the same valve. Of course an all-air or all-oil system could use a single valve if desired.

Thus, the applicant has disclosed an improved and inexpensive apparatus for preventing the downshift of a transmission unless it is in the torque converter mode or when a panic-stop is called for by the vehicle operator. While illustrated and described as a single preferred embodiment, together with a possible alteration, the invention is capable of variation and modification within the purview of the following claims in many ways which will be obvious to those skilled in the art. As an example of another possible alteration brake line 85 could lead to the spring side of piston 35 in preventer 33, and thus valve 11a could be eliminated by delivering air in line 27 directly to compartment 31.

I claim:

1. In a vehicle having a transmission, said transmission including a plurality of speed ranges, a plurality of modes of operation in each speed range, and transmission control linkage for controlling said transmission, and further including means for preventing downshifting from one range to a lower range comprising a sequentially stepped cam having successively recessed portions thereon, said cam being mounted on said transmission control linkage and a follower actuable into said successively recessed portions of said cam, means motivating said follower toward contact with said cam, and means for deactivating said motivation means in response to a predetermined mode of operation signal, said plurality of modes comprise three in number which are the torque converter, direct, and overdrive modes and wherein said predetermined mode is the torque converter mode.

2. The system of claim 1 wherein said means for deactivating said motivation means also deactuates said cam follower in response to a signal due to emergency braking of the vehicle utilizing the system.

3. The apparatus of claim 1 wherein said means for deactivating said motivation means also deactivates said motivation means in response to an override signal generated by panic-stopping of the vehicle.

4. The apparatus of claim 1 wherein said motivation means includes means biasing said cam follower toward a position such that said cam follower does not contact said cam.

5. In a transmission downshift prevention device including a transmission control linkage, a sequentially stepped cam on the transmission control linkage, a cam follower pneumatically actuated into contact with the cam, and valve means deactuating said cam follower in response to a signal generated due to the transmission being in a predetermined mode of operation, said valve means comprising a body having a piston actuated spool and means biasing the piston actuated spool in a first direction, and also having a free-floating spool and means biasing the free-floating spool in the opposite direction.

6. The system of claim 5 wherein said free-floating spool has a sealing means therein whereby, when said piston-actuated valve is actuated against the force of its biasing means, the free floating valve is actuated by its biasing means to shut off flow through the valve to an actuation means for the cam follower, while allowing passage of pneumatic flow from the cam follower actuator to the atmosphere.

7. In a vehicle having a transmission, said transmission including a plurality of speed ranges, a plurality of modes of operation in each speed range, transmission control linkage for controlling said transmission, means for preventing downshifting from one range to a lower range comprising a cam having successively recessed portions thereon, said cam being mounted on said transmission control linkage, a follower actuable into said successively recessed portions of said cam, means motivating said follower toward contact with said cam, and means for deactivating said motivation means in response to a predetermined mode of operation signal generated when said transmission is in a predetermined one of said plurality of modes, said means for deactivating said motivation means comprising valve means, said valve means comprising a body having therein a piston actuated spool and means biasing said piston actuated spool in a first direction, and further having a free-floating spool and means biasing said free-floating spool in the opposite direction.

8. The apparatus of claim 7 wherein said free-floating spool has a sealing means therein whereby, when said piston actuated valve is actuated against the force of its biasing means, said free-floating spool is actuated by its biasing means to shut off flow through the valve to said motivation means while allowing flow passage to atmosphere.

9. In a vehicle having a transmission with a plurality of speed ranges and torque converter, direct, and overdrive modes of operation in each speed range, means for preventing downshifting from one range to a lower range, said transmission having transmission control linkage thereon, said downshift preventing means comprising a cam with a plurality of stops mounted on the control linkage and a follower successively engageable into any one of said stops of said cam, fluid means biasing said follower toward contact with said cam, resilient means biasing said follower away from said cam, said fluid means being provided with means for operatively connecting said fluid means with a torque converter, whereby a converter signal controls said fluid means to deactivate said follower from its cam-contacting position in response to said signal.

10. The apparatus of claim 9 further including means for deactivating said fluid means biasing said follower toward contact with said cam from its cam-contacting position in response to a signal generated by an emergency actuation of the brakes of the vehicle.